June 10, 1958 G. C. REISER ET AL 2,838,299
WEIGHBRIDGE
Filed July 29, 1955 3 Sheets-Sheet 1
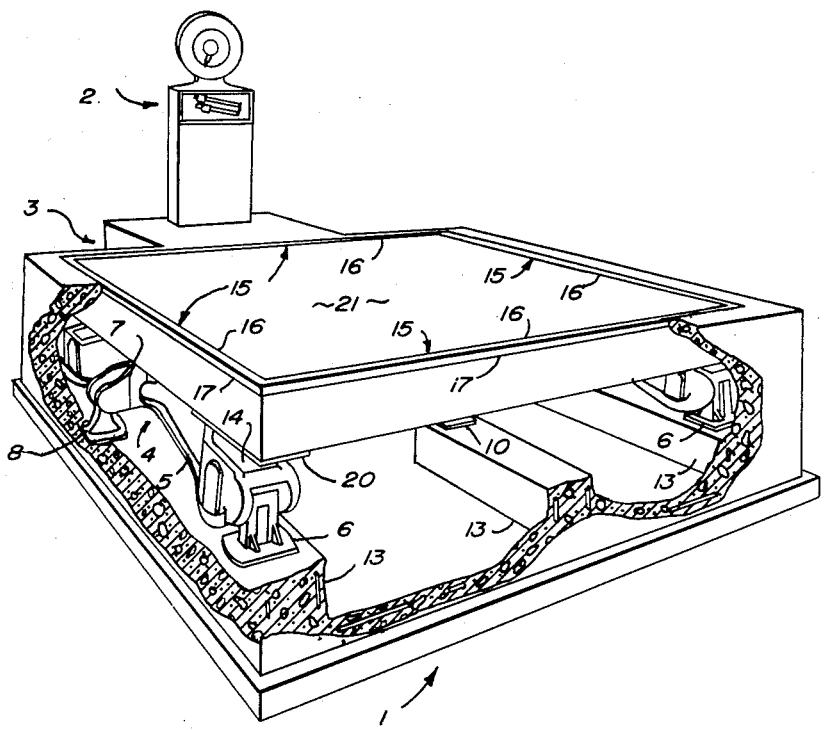
Fig. I
INVENTORS
GEORGE C. REISER
CALVERT H. SHUPTRINE
BY
Marshall, Marshall & Yeasting
ATTORNEYS June 10, 1958  G. C. REISER ET AL  2,838,299
WEIGHBRIDGE
Filed July 29, 1955  3 Sheets-Sheet 2
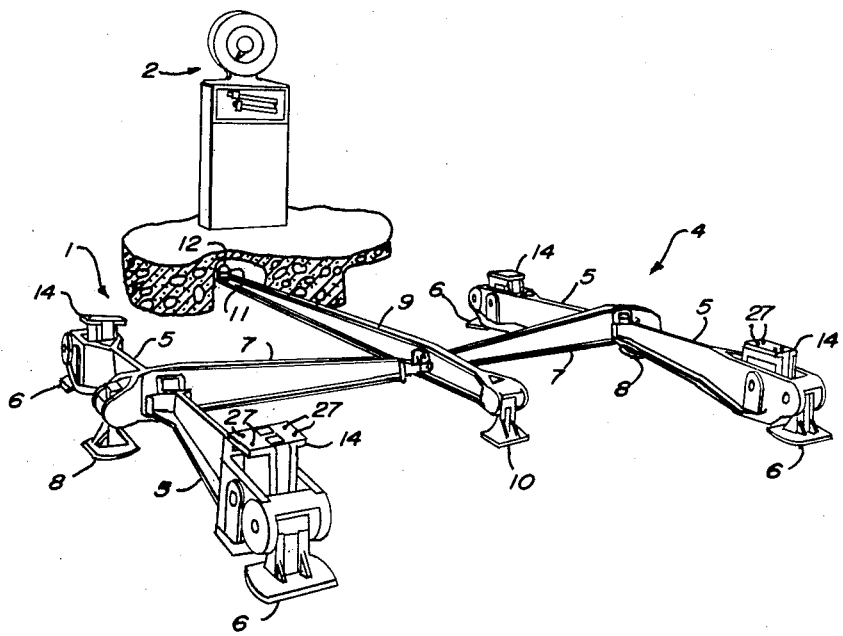
Fig. II
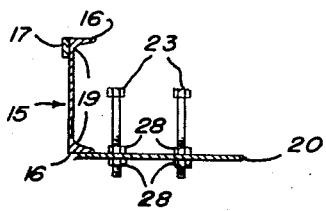
Fig. IV
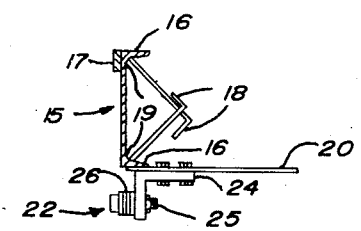
Fig. V
INVENTORS
GEORGE C. REISER
CALVERT H. SHUPTRINE
BY
ATTORNEYS June 10, 1958
G. C. REISER ET AL
2,838,299
WEIGHBRIDGE
Filed July 29, 1955
3 Sheets-Sheet 3
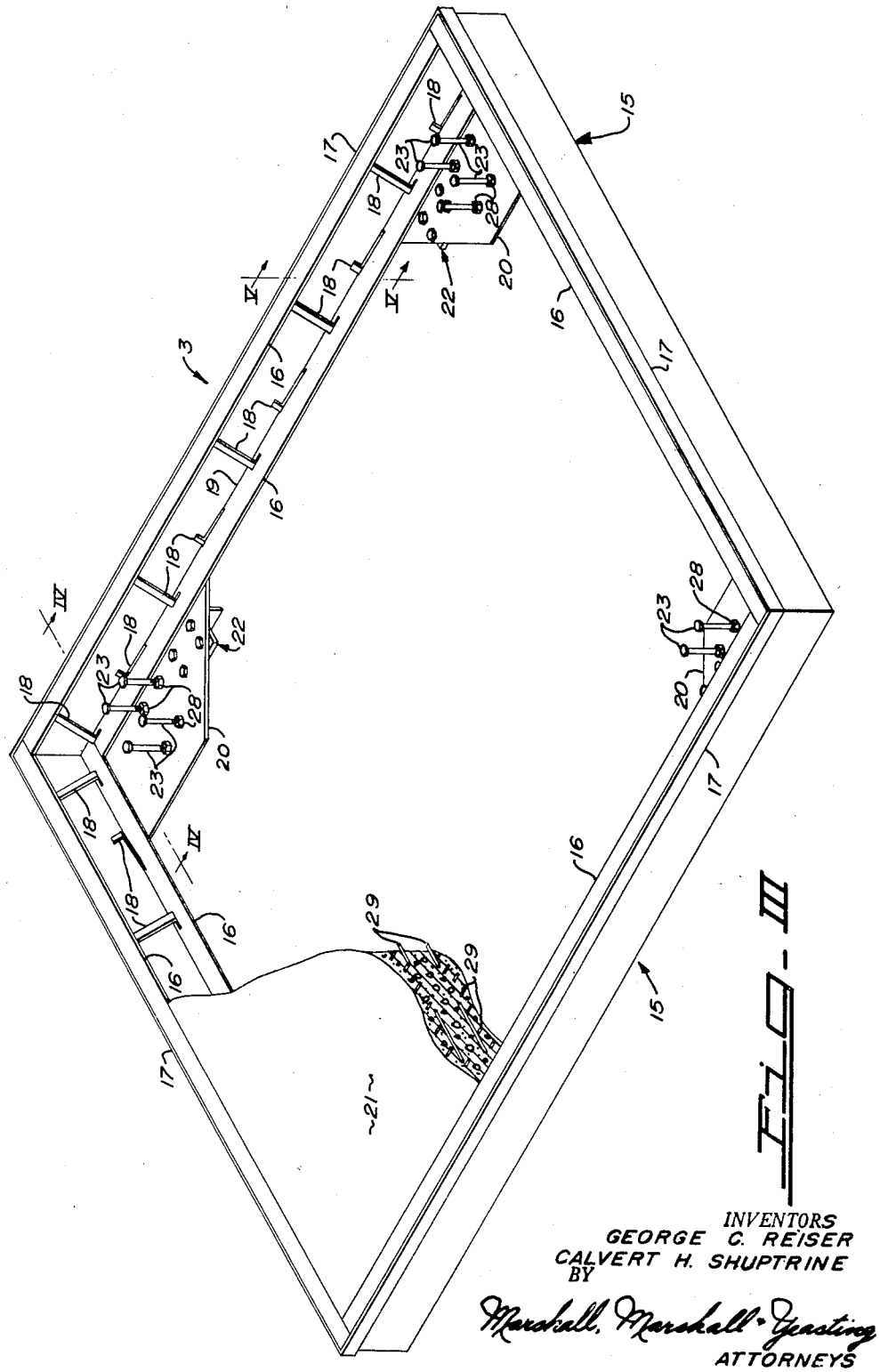
Fig. III
INVENTORS
GEORGE C. REISER
CALVERT H. SHUPTRINE
BY
Marshall, Marshall & Yeasting
ATTORNEYS United States Patent Office 2,838,299
Patented June 10, 1958

2,838,299

WEIGHBRIDGE

George C. Reiser and Calvert H. Shuptrine, Toledo, Ohio, assignors, by mesne assignments, to Toledo Scale Corporation, Toledo, Ohio, a corporation of Ohio Application July 29, 1955, Serial No. 525,179

2 Claims. (Cl. 265—71)

This invention relates to weighbridges and particularly to load receiving platforms employed in weighing scales designed to weigh relatively heavy loads, such as loaded motor trucks.

The weighing of motor trucks, both when empty and when loaded, is a very important operation in industry and daily commerce. Weighing scales for this purpose have evolved from wagon scales used years ago. Modern truck scales are capable of weighing loaded truck-and-trailer combinations up to loads of 60 tons and have weighbridges as large as 60 feet by 10 feet. As the capacities of the weighing scales increased from the wood-decked wagon scales of yesterday to the concrete-decked truck scales of today, designers added more and more steel members to strengthen the weighbridges to withstand the greater loads encountered. Such increased use of steel together with the steadily increasing cost of steel have caused modern truck scale weighbridges to be very expensive.

Heretofore, such weighbridges, although ruggedly constructed to withstand heavy loads, were necessarily made relatively light in weight because of the high cost of the steel and special precautions were mandatory, because of the light weight, to guard against substantial tipping of the weighbridges when a truck or other load was moved thereupon. These precautions took the unsatisfactory forms of either locating the fulcrum pivots of the main levers in cavities in the walls of the scale pits away from underneath the weighbridges or providing hold-down guard members.

The principal object of this invention is to provide an improved and rugged weighbridge that includes relatively little steel in its structure.

Another object of the invention is to provide an improved and rugged weighbridge that has a simple channel iron frame and a concrete slab formed in the frame and that has a relatively large total weight to prevent tipping by loads within the capacity of the scale and yet includes relatively little steel in its structure.

Still another object of the invention is to provide, in a weighbridge having a simple channel iron frame and a concrete slab formed in the frame, improved means for reinforcing the structure and knitting it together.

A further object of the invention is to provide improved means for attaching a weighbridge to the lever mechanism of a weighing scale.

More specific objects and advantages are apparent from the following description of a specific embodiment of the invention.

According to the invention, a heavy capacity weighing scale is provided with an improved and rugged weighbridge. The weighbridge comprises a simple channel iron frame and a concrete slab formed in the frame with its peripheral portion embraced by the channels. A plurality of snags are secured to the inwardly directed surfaces of the channels and are embedded in the peripheral portion of the concrete slab to knit the channels and the slab together. Bolts embedded in the bottom of the concrete slab provide simple means having great strength and rigidity for attaching the weighbridge to suspension bearing members carried by the lever mechanism of the weighing scale.

Relatively little steel is used in the weighbridge for economy purposes and a relatively great amount of concrete is used to increase the ruggedness and the total weight. The large total weight prevents tipping when a truck or other load within the capacity of the weighing scale is moved upon the weighbridge.

The invention may be more readily understood from the following detailed description of a specific embodiment in which reference is made to the accompanying drawings.

In the drawings:

Figure I is a perspective view of a weighing scale embodying the invention.

Figure II is a perspective view of the weighing scale shown in Figure I with its weighbridge and certain adjuncts removed.

Figure III is a perspective view of the weighbridge shown in Figure I with part of its composite steel and concrete deck broken away to show interior details.

Figure IV is a vertical sectional view taken along the line IV—IV of Figure III.

Figure V is a vertical sectional view taken along the line V—V of Figure III.

Referring to Figures I and II, a weighing scale pit 1 of an axle load truck scale, as well as a cabinet 2 or other supporting means for tare offsetting and load counter-balancing mechanism, my be of any preferred construction, and is illustrated herein merely to show the relation of the improved weighbridge 3 thereto. Lever mechanism 4 may also be of any preferred construction, that illustrated being a seven-lever system comprising two pairs of main levers 5, one pair being located at each end of the pit 1 and each pair extending from their fulcrum stands 6 toward each other. Located between the adjacent ends of each pair of main levers 5 and extending toward the center of the pit 1 is an end or extension lever 7 fulcrumed upon their fulcrum stands 8. Located between the adjacent ends of the end levers 7, is a transverse lever 9 which extends perpendicularly to the end levers 7 from its fulcrum stand 10 located near the center of the pit 1 to a point beneath the cabinet 2. The transverse lever 9 is connected to the offsetting and counterbalancing mechanism of the weighing scale by means of a stirrup 11 and a steelyard rod 12. All seven of the fulcrum stands 6, 8 and 10 are supported upon composite steel and concrete pedestals or piers 13 rising from the floor of the pit 1.

The weighbridge 3 and load are supported at four points, i. e., by the usual load pivots of each main lever 5, upon suspension bearing members 14 carried by the main levers 5. A load causes the main levers 5 to exert a downward pull on each of the two end levers 7. The end levers 7, in turn, exert a downward pull on the transverse lever 9, which is connected to the steelyard rod 12 and, hence, a downward pull on the steelyard rod.

Referring now to Figure III, the weighbridge 3 includes a rectangular frame structure formed from four channel irons 15 secured together, as by welding, at their ends. The backs of the channels 15 form the outer edge of the weighbridge 3 and the flanges 16 of the channels 15 form the marginal area of the weighbridge. The top marginal area of the weighbridge 3 is slightly increased by four bars 17 welded one to the back of each of the channels 15 to form an overhanging portion of the weighbridge.

The channel iron frame also includes a plurality of snags 18, shown in detail in Figure V, which are secured, as by welding, in staggered relationship in the upper and lower inwardly directed corners 19 of the channels 15 and a plate 20 which is fixed at the bottom of each corner of the frame structure. The plates 20 have a four-fold function, namely, to help stiffen the channel iron frame, to help support a composite steel and concrete slab 21 formed in the frame, to support bumpers 22, shown in detail in Figure V, and to provide a mounting means for a plurality of bolts 23 used in attaching the weighbridge 3 to the suspension bearing members 14 (Figures I and II). The bumpers 22, attached one to each of the plates 20, each include a bracket 24 (Figure V) that is fixed to the plate 20 and that carries a bolt 25 having a stack of washers 26 thereon. The bumpers 22 function to limit horizontal motion of the weighbridge 3 after a truck moves on or off of the weighbridge.

There are four of the bolts 23 extending through each one of the plates 20 and they are located during assembly in the factory to correspond to holes 27 through the tops of the suspension bearing members 14. The bolts 23 are locked with nuts 28 (Figure IV) before the composite steel and concrete slab 21 is formed in the channel iron frame and after the slab 21 is so formed the greater part of each of the bolts 23 is deeply embedded in the concrete and therefore has great rigidity. When the weighbridge 3 is to be attached to the suspension bearing members 14 in the field, the exposed or lowermost ones of the nuts 28 are removed, the ends of the bolts 23 are inserted in the holes 27 in the suspension bearing members 14, and the nuts 28 rethreaded on the ends of the bolts 23—a simple, efficient and low-cost method of attaching the weighbridge 3 to the lever mechanism 4 of the weighing scale.

The composite steel and concrete slab 21 is formed in the channel iron frame in the field near the site of the truck scale. Metal or wood sheets are first laid between the plates 20 as forms to help support the wet concrete, steel reinforcing rods 29 (Figure III) are then laid or supported in a crisscross pattern between the channel irons 15, and the concrete is poured forming the composite steel and concrete slab 21 which has its peripheral portion embraced by the channels 15 and its corners supported by the tops of the plates 20. The wet concrete flows about the plurality of snags 18 secured to the inwardly directed surfaces of the channels 15 which embedded snags add greatly to the strength of the weighbridge 3 by knitting the channels 15 and the composite steel and concrete slab 21 together.

Since only a relatively small amount of steel is used in the weighbridge 3 (most of the weight of the steel being in the simple channel irons 15 and in the reinforcing rods 29) as compared to the amount used in prior art weighbridges, a weighbridge constructed according to the invention results in a very low cost structure. Furthermore, because of the relatively little weight of steel used in the structure, a very heavy concrete slab may be used and the structure still will be of low cost. As shown in Figure III, the composite steel and concrete slab 21 is as thick as the height of the channel irons 15. In a typical installation, the slab 21 may be ten inches thick and therefore of great weight.

The relatively great weight of the composite slab 21 increases the ruggedness of the weighbridge 3 and adds greatly to its total weight. The large total weight prevents tipping when a truck or other load within the capacity of the weighing scale is moved upon the weighbridge. The total weight of the weighbridge 3 is so great that no hold-down guard members need be provided as must be done in prior art weighbridges. Furthermore, the total weight of the weighbridge 3 is so great that the fulcrum stands 6 for the main levers 5 may be located underneath the weighbridge 3 without danger that the weighbridge will be tipped by a load within the capacity of the weighing scale. Such location of the fulcrum stands 6 permits the scale pit 1 to be constructed with vertical walls and to be of relatively small size.

The composite steel and concrete slab 21 has embedded therein both the plurality of snags 18 secured to the inwardly directed surfaces of the channels 15 and the bolts 23 extending through the plates 20. The embedded snags 18 add to the strength of the structure by knitting the channels 15 and the slab 21 together and the embedded bolts 23 provide a means having great strength and rigidity for easily attaching the weighbridge 3 to the suspension bearing members 14 in the field.

Various modifications in details of construction of the parts of the weighbridge may be made without departing from the spirit and scope of the invention.

Having described the invention, we claim:

1. A weighbridge that comprises a channel iron frame, the backs of the channels forming the outer edges of the weighbridge and the flanges of the channels forming the marginal area of the weighbridge, a plurality of snags secured to the inwardly directed surfaces of the channels, a concrete slab formed in the frame with its peripheral portion embraced by the channels and with the snags embedded in said peripheral portion, and coupling means embedded in the slab and extending below the frame.

2. In a weighing scale, in combination, a plurality of suspension bearing members, and a weighbridge that is carried by the suspension bearing members and that comprises a channel iron frame, the backs of the channels forming the outer edges of the weighbridge and the flanges of the channels forming the marginal area of the weighbridge, a plurality of snags secured to the inwardly directed surfaces of the channels, a concrete slab formed in the frame with its peripheral portion embraced by the channels and with the snags embedded in said peripheral portion, and means including a plate fixed at each corner of the frame and a plurality of bolts that extend through each one of the plates and that are embedded in the slab for attaching the weighbridge to the suspension bearing members.

References Cited in the file of this patent

UNITED STATES PATENTS

| | | |
|---|---|---|
| 98,033 | Coignet | Dec. 21, 1869 |
| 890,769 | Hewett | June 16, 1908 |
| 917,859 | Fusch | Apr. 13, 1909 |
| 1,574,112 | Reeves | Feb. 23, 1926 |
| 1,706,963 | Reeves | Mar. 26, 1929 |
| 1,759,885 | Bousfield | May 27, 1930 |
| 2,091,061 | Waugh | Aug. 24, 1937 |
| 2,300,113 | Faber | Oct. 27, 1942 |

FOREIGN PATENTS

| | | |
|---|---|---|
| 407,154 | Great Britain | Mar. 15, 1934 |
| 434,857 | Italy | May 4, 1948 |
| 440,703 | Italy | Oct. 16, 1948 |